United States Patent

[11] 3,621,103

[72] Inventor John Campbell
Sheffield, England
[21] Appl. No. 7,085
[22] Filed Jan. 30, 1970
[45] Patented Nov. 16, 1971
[73] Assignee The British Iron and Steel Research Association
London, England
[32] Priority Feb. 17, 1969
[33] Great Britain
[31] 8,446/69

[54] METHODS OF AND APPARATUS FOR STIRRING IMMISCIBLE CONDUCTIVE FLUIDS
12 Claims, 8 Drawing Figs.
[52] U.S. Cl. .................................................. 13/9
[51] Int. Cl. .................................................. H05b 3/60
[50] Field of Search .................................. 13/9 ES, 26 S, 27 S; 259/DIG. 46

[56] References Cited
UNITED STATES PATENTS
3,246,373 4/1966 Lyman ..................... 259/DIG. 46
FOREIGN PATENTS
979,583 1/1965 Great Britain ............... 13/9 ES Primary Examiner—Bernard A. Gilheany
Assistant Examiner—R. N. Envall, Jr.
Attorney—Holcombe, Wetherill & Brisebois ABSTRACT: The invention relates to the stirring of mutually immiscible liquids which meet at an interface. An electric current is passed through the interface and oppositely directed magnetic field components are produced perpendicular to the direction of current flow in the fluids adjacent the interface. There thus result in the fluids adjacent the interface oppositely directed forces which produce stirring of the fluids.

PATENTED NOV 16 1971

METHODS OF AND APPARATUS FOR STIRRING IMMISCIBLE CONDUCTIVE FLUIDS

This invention relates to improved methods of producing stirring in mutually immiscible, electrically conductive fluids and apparatus for carrying out the improved methods. In particular the invention concerns a method of and apparatus for producing directionally opposed movements in juxtaposed fluids which are thereby stirred. The term fluid as used in the present specification is to be taken as comprehending within its scope liquids, gases or plasmas and also fluidized or suspended solids.

The production of chemical reactions between immiscible electrically conductive liquids is of importance in many industrial processes. Although the present invention will be more particularly described as applied in steelmaking and steel-refining operations it is by no means limited thereto but is equally applicable to the improvement of other operations where the mutual intermixing of relatively immiscible and electrically conductive fluids is required.

It is an object of the invention to provide an improved method of obtaining stirring of mutually immiscible electrically conductive fluids meeting at an interface.

It is a further object of the invention to provide an improved method of obtaining stirring of fluid components in an electroslag refining process.

It is also an object of the invention to provide an improved apparatus for obtaining stirring of two mutually immiscible electrically conductive fluids meeting at an interface by interaction between an electric current passed through the fluids and opposed magnetic field components producing opposed forces within the fluids adjacent the interface.

In one aspect the present invention provides a method of producing stirring mutually immiscible electrically conductive fluids meeting at an interface by passing an electric current from one to the other of said fluids through said interface and subjecting the fluids to a magnetic field having oppositely directed components perpendicular to the direction of electric current flow in the respective fluids adjacent the interface whereby interaction between the electric current and the magnetic field components produces oppositely directed forces within said respective fluids adjacent said interface whereby stirring of said fluids is produced.

An embodiment of the invention provides apparatus for producing stirring of mutually immiscible electrically conductive fluids. The apparatus includes a container for the fluids, means for passing an electric current between a member in conductive connection with one fluid and an electrode immersed in the ocher fluid. The current passes from one fluid to the other through the interface between them. The apparatus also includes means for producing within the container a magnetic field distribution with oppositely directed components perpendicular to the direction of electric current flow adjacent the interface whereby the interaction between the electric current and the magnetic field components produces oppositely directed forces within the respective fluids adjacent the interface whereby stirring of the fluids is produced.

The features of the invention which are believed to be novel are set forth with particularity in the appended claims. The invention itself together with further features and advantages thereof will be best understood from the following description taken in conjunction with the drawings, of which:

Figure 1:
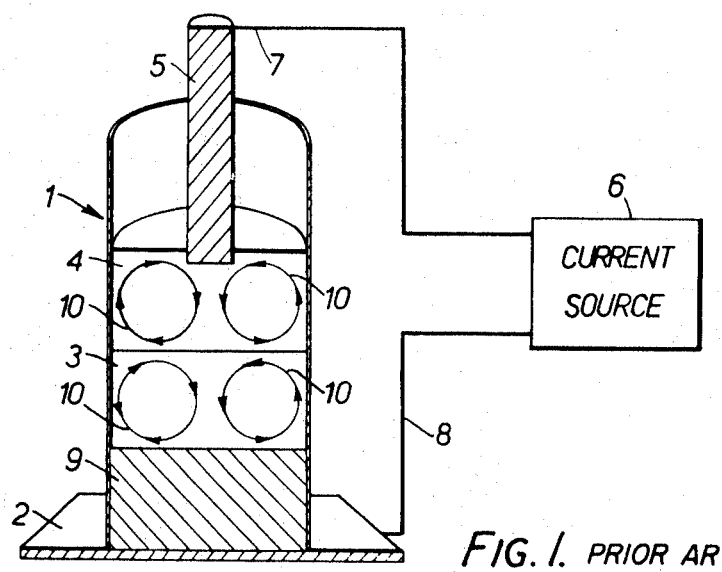
FIG. 1 is a schematic diagram illustrating a known form of apparatus for carrying out an electroslag process for refining metal.

The known arrangement shown in FIG. 1 comprises an open-topped container 1 which is provided with a baseplate 2 of electrically conductive material. A pool or layer 3 of molten metal is formed in container 1, and supenatant upon the metal layer lies a layer 4 of slag. Into slag layer 4 dips a top electrode 5, made of the metal to be refined, which is used to pass an electric current through the superimposed layers of metal and slag. To this end electrode 5 and baseplate 2 upon which the container rests are connected to an AC or DC electric current source 6 by leads 7, 8. Current source 6 is thus connected to a member (in this case the baseplate 2, though some other arrangement could equally well be adopted) which is conductively connected with the lower of the fluids and to the electrode 5 immersed in the upper of the fluids in the container. The current thus passed through the apparatus maintains the temperature of the slag above the melting point of the metal which is to be refined. Drops of this metal are therefore continually melted from electrode 5 and fall through the slag layer 4 into the pool 3 of metal which gradually solidifies as indicated at 9 to form an ingot. The walls and baseplate are preferably cooled by an external coolant (not shown), conveniently water circulated through double walls of the container.

A certain amount of stirring occurs naturally in the process as a result of electromagnetic and convection effects. This stirring takes the form of a toroidal current indicated by arrowed lines 10, moving away from the tip of the consumable top electrode 5 and towards the bottom electrode or baseplate 2. With small electrodes this stirring effect can be pronounced within the slag layer, but is generally much less in the metal pool. The effects of these naturally occurring stirring actions are normally so slight as not to have any appreciable effect upon the process. With larger electrodes the velocity of stirring is further reduced in both layers.

Figure 2:
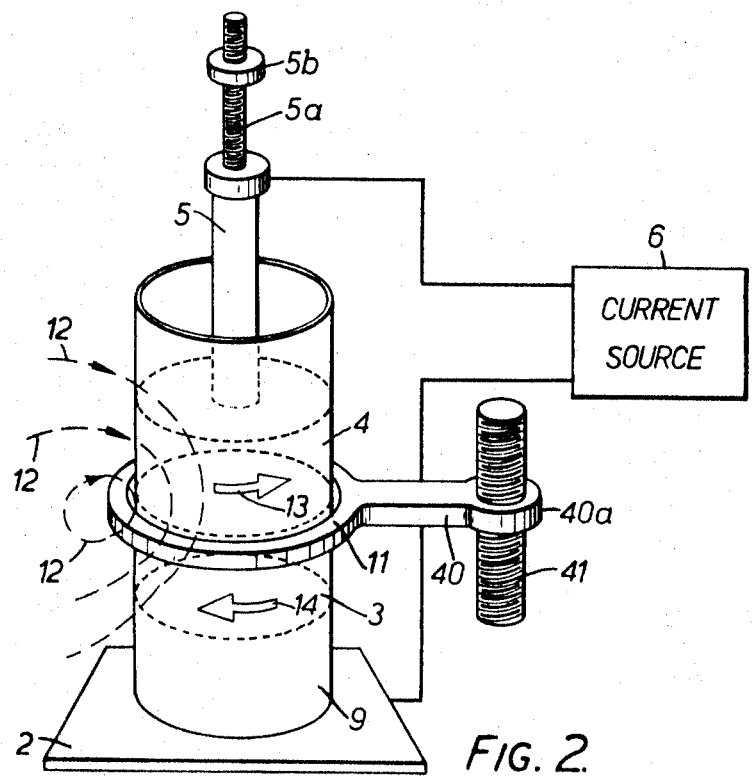
FIG. 2 illustrates the apparatus of FIG. 1 modified for carrying out the present invention.

FIG. 2 illustrates schematically one embodiment of apparatus for carrying out the present invention. A container 1, which in this case must be of nonmagnetic refractory material, and may, for example, be of stainless steel or copper, again contains superimposed layers of molten metal 3 and of liquid slag 4, a consumable top electrode 5 of the metal to be refined being arranged to be immersible in the slag layer. For example, electrode 5 may be supported by a screw-threaded rod 5a working in a nut 5b. In known manner nut 5b is prevented from axial movement and is arranged for controlled rotation about its axis to raise or lower electrode 5. As before, the refined metal gradually solidifies at 9. In order to produce efficient electromagnetic stirring in accordance with the invention, a coil 11 is placed about the container substantially at the level of the interface between the metal and the slag and is excited by an electric current so as to produce within the container a magnetic field of which the lines of force in one radial plane are indicated by broken lines 12. For the sake of convenience in illustration, the coil 11 is shown as consisting of a single turn only, but may in practice consist of any convenient number of turns to obtain as high as possible a flux density from an available electric supply. At the point where the magnetic field generated by the external coil is parallel to the direction of electric current flow in the fluid, there will be no force tending to produce motion. At any other point, the component of the magnetic field perpendicular to the direction of electric current flow will interact with an electric current in the fluid to produce motion in the fluid according to Fleming's Left-Hand Rule. The axial length of the coil is advantageously kept as short as possible in order to ensure that the lines of force of its magnetic field diverge rapidly above and below the coil to produce as large as possible a component of magnetic field perpendicular to the direction of the electric current path from top electrode 5 to baseplate 2.

It will be seen that the direction of this radial component in the slag layer is opposite to its direction in the metal pool, so by the application of Fleming's Left-Hand Rule interaction between the electric current and the magnetic fields will result in forces tending to rotate the slag and the metal in opposite directions as indicated by respective arrows 13 and 14. The relative speeds of movement depend upon the magnitude of the electric current, the strength of the magnetic field and the geometry of the apparatus. (For example, the relative depths of the slag and metal layers, size of the electrode and depth of immersion.)

Since optimum stirring is obtained when the plane of the coil is appropriately related to the slag/metal interface, means are preferably provided whereby the position of the coil in the direction perpendicular to the interface, that is, its vertical position, may be adjusted as the height of refined metal increases. In the embodiment shown in FIG. 2 the coil 11 is carried on a support member 40 of which a portion 40a forms a nut working upon a vertically disposed screw 41 which is arranged by conventional means (not shown) to be rotated in one or in the other direction whereby to raise or lower the coil. Some control over the stirring conditions can be obtained by altering the relation between the coil and the slag-metal interface. If the coil is progressively lowered below the interface the meal can be brought to rest and the velocity of rotation of the slag increase, and vice versa.

It is believed that the production of greater stirring action in the slag layer than in the metal layer may be beneficial, since under these conditions the meal droplets falling from top electrode 5 are observed not to fall through a short vertical path but to follow a widening volute path, thus increasing their time of contact with the slag and further enhancing the refining action.

Figure 3:
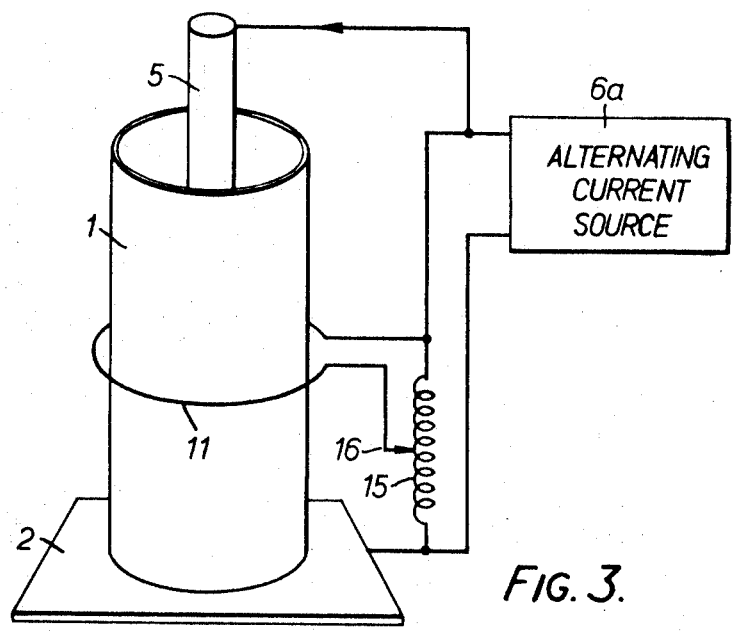
FIGS. 3 and 4 illustrate alternative arrangements for electromagnets employed in carrying out the present invention.
Figure 4:
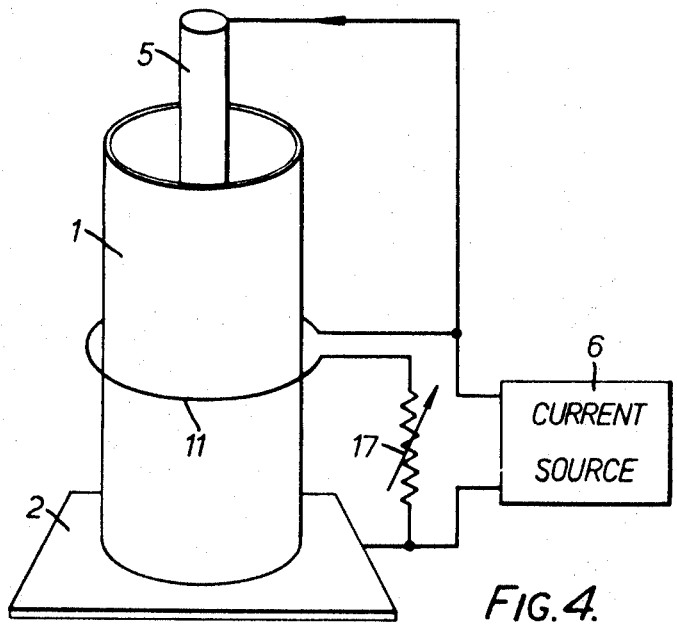

FIGS. 3 and 4 show methods for varying the magnitude of the magnetic field produced by the coil 11. In FIG. 3, which is applicable to AC systems only, the winding 15 of an adjustable-ratio transformer, most conveniently an autotransformer as shown, is connected across an AC supply 6a and coil 11 is fed with the voltage developed between one end of the winding and an adjustable capping 16. In FIG. 4, which is applicable to either DC or AC systems, coil 11 is connected across the supply in series with an adjustable resistor 17. Other, more complex, control systems employing selectively variable series-parallel combinations of coil sections may be employed.

Figure 5:
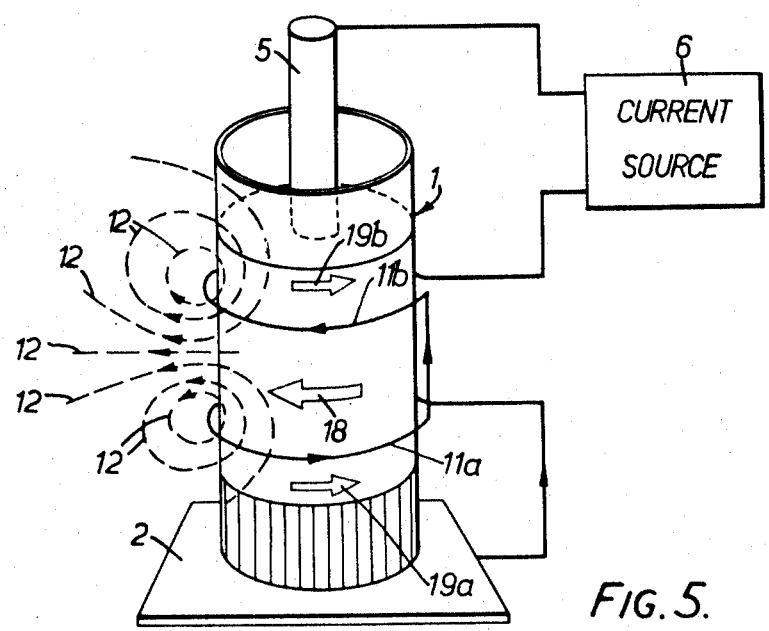
FIGS. 5 and 6 illustrate different arrangements of electromagnets which may be used in carrying out the invention.

In a modification of the invention two field coils spaced along the axis of symmetry of the container are used both to produce an increased magnetic flux density and to cause the lines of force of the field to extend much more nearly radially in the central stirring zone. As shown in FIG. 5 two coils 11a and 11b replace the single coil 11 of FIG. 1. These coils are so connected that their magnetic fields are in opposition along the axis of the coil, resulting in a magnetic field distribution of which the lines of force in one radial plane are indicated by broken lines 12. As shown, coils 11a, 11b may be connected in series with the current path through the container. Alternatively they may be fed as described for the single coil in relation to FIGS. 3 and 4, or may be fed from a supply or supplies distinct from that used to feed the current to the refining container This arrangement produces greatly concentrated stirring, indicated by arrow 18, in the plane of symmetry between the field coils. Small opposing flows where the magnetic fields again diverge are indicated by arrows 19a, 19b. By appropriate adjustment of the axial height of the coil assembly the concentrated stirring action may be arranged to occur in the slag layer immediately above the slag/metal interface. Instability in the interface is thus promoted, with enhanced mixing action.

Figure 6:
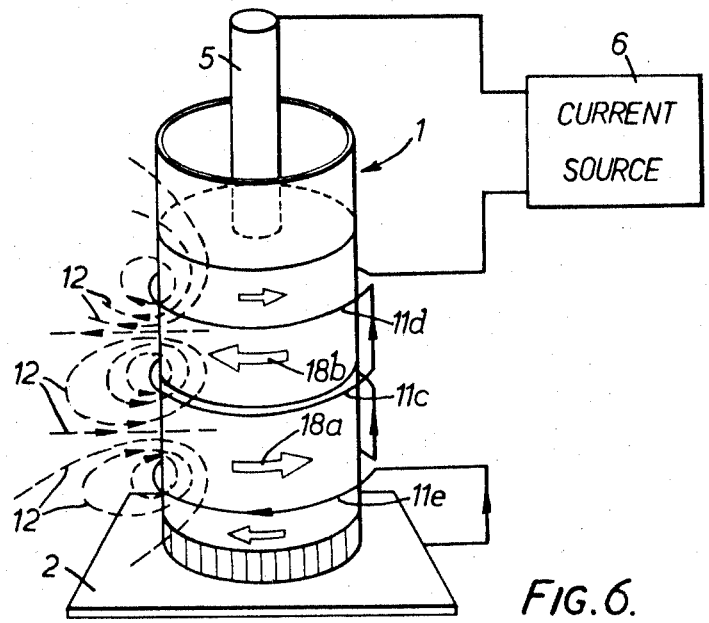

FIG. 6 shows how three axially short coils 11c, 11d 11e surrounding the container and spaced along its axis so that one coil, 11c, is substantially at the level of the interface while coils 11d and 11e are spaced from the first coil on opposite sides thereof and each produce a magnetic field opposed to that of the first coil, may be used to produce concentrated stirring actions in opposite directions, as indicated by arrows 18a, 18b. The disposition of the magnetic field in one radial plane is again as indicated by broken lines 12.

In an alternative embodiment of the invention, the means for producing a magnetic field having the required distribution includes two magnet systems disposed on opposite sides of the interface. Each magnet system includes components disposed on opposite sides of the container and arranged to produce a magnetic field of which the lines of force run generally parallel to the interface. The magnetic fields produced by the two magnet systems are oppositely directed.

Figure 7:
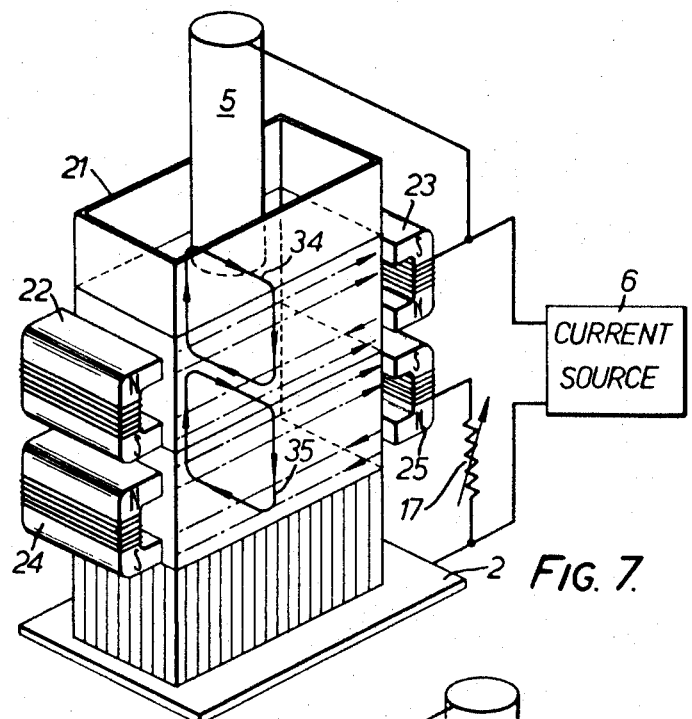
FIGS. 7 and 8 illustrate arrangements for applying the present invention to the stirring of fluids contained in containers of rectangular parallelepipedal form.
Figure 8:
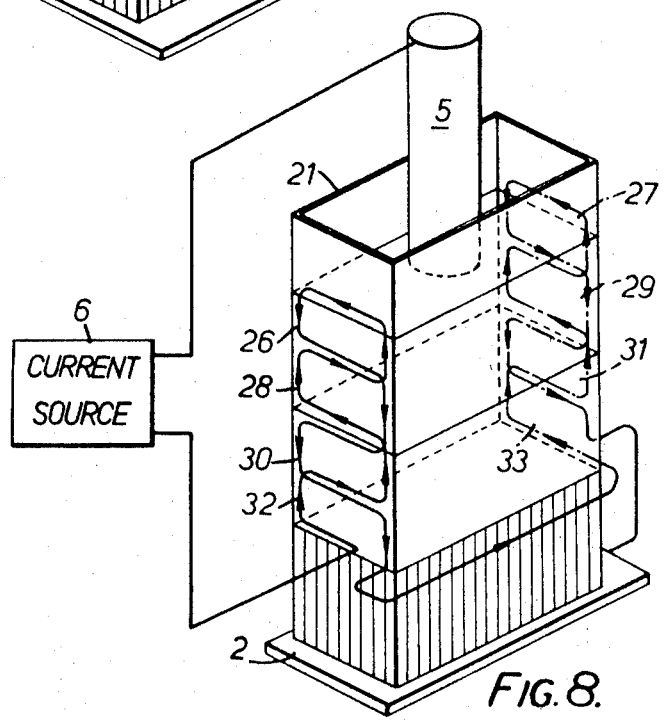

FIGS. 7 and 8 show alternative arrangement applied for producing stirring in a container 21 of rectangular parallelepipedal form, though this form of container may be varied. In this case it is preferably arranged that the lines of force of the magnetic field pass transversely through the container parallel to the shorter pair of vertical sides (FIGS. 7 and 8 are distorted for clarity) and perpendicular to the vertical direction of current flow in the container between top electrode 5 and baseplate 2. To this end in FIG. 7 the magnet systems comprise pairs of electromagnets 22, 23 and 24, 25, having U-shaped ferromagnetic cores, which are disposed at opposite sides of the container and excited so that they develop opposed poles, as indicated by the references S and N shown on the magnets. As before, the magnets may, as shown, be fed in series from the current supply, the field intensity being controlled by an adjustable resistor 17. Alternatively, a separate supply may be used, or in applications where a direct current is used for heating permanent magnets could replace the elctromagnets. In FIG. 8 the magnet systems comprise opposed pairs of coils 26, 27; 28, 29; 30, 31; and 32, 33, which are provided upon the sidewalls of the container.

In both these arrangements the axis of stirring will be perpendicular to the direction of current flow and to the lines of force of the magnetic fields, as indicated by arrowed lines 34 and 35 in FIG. 7. The use of four sets of coils, or pairs of pole pieces is designed to produce the maximum stirring effect, though some of these elements may be omitted if lower velocity stirring is required. Where alternating current is used it must be arranged that the electromagnets are energized in phase with the current in the apparatus.

Any embodiment of the invention may include means for adjusting the vertical position of the means for producing the magnetic field. Such adjusting means may be generally as described in relation to FIG. 2, the modifications necessary for other embodiments being deemed obvious.

What is claimed is:

1. A method of producing stirring of mutually immiscible electrically conductive fluids meeting at an interface comprising the steps of passing an electric current from one to the other of said fluids through said interface and
generating a magnetic field adjacent said interface with components perpendicular to the direction of electric current flow which are oppositely directed in said respective fluids adjacent said interface whereby interaction between said electric current and said respective magnetic field components produces oppositely directed forces within said respective fluids adjacent said interface whereby stirring of said fluids is produced.

2. The improvement set forth in claim 1 characterized in that said interaction between said electric current and said magnetic field produces oppositely directed motions within said respective fluids adjacent said interface.

3. Apparatus for producing stirring of mutually immiscible electrically conductive fluids meeting at an interface including a container for said fluids, comprising means for passing an electric current from one to the other of said fluids adjacent said interface and means for producing a magnetic field within said container adjacent said interface, said means for producing a magnetic field within said container forming a magnetic field with components perpendicular to the direction of electric current flow which are oppositely directed in said respective fluids adjacent said interface whereby interaction between said electric current and said respective magnetic field components produces oppositely directed forces within said respective fluids adjacent said interface so that oppositely directed movements of said fluids at said interface are produced.

4. The improvement set forth in claim 3 characterized in that said means for producing said magnetic field components includes a coil surrounding said container substantially at said interface whereby to produce oppositely radially directed components of magnetic flux in said fluids adjacent said interface.

5. The improvement set forth in claim 4 characterized by adjusting means operable to adjust the position of said coil with respect to said container in the direction perpendicular to said interface.

6. The improvement set forth in claim 3 characterized in that said means for producing said magnetic field components includes two spaced-apart coils surrounding said container, means for supplying to said coils electric currents such that said coils produce oppositely directed magnetic fields and means supporting said coils each on a respective side of said interface.

7. The improvement set forth in claim 3 characterized in that the means for producing said magnetic field components comprises a first coil surrounding said container; means supporting said first coil substantially at the level of said interface; a second coil surrounding said container; means supporting said second coil at a position spaced from said first coil on one side of said interface; a third coil; means supporting said third coil at a position spaced from said first coil on the other side of said interface; means supplying said first coil with electric current whereby to produce a first magnetic field and means supplying said second and third coils with respective electric currents whereby to produce respective second and third magnetic fields oppositely directed to said first magnetic field, said first second and third magnetic fields combining to form said oppositely directed magnetic field components.

8. The improvement set forth in claim 3 characterized in that the means for producing said magnetic field components includes two magnet systems, each said magnet system including magnet system components disposed on opposite sides of said container, means supporting said magnet systems respectively at spaced positions along said container in the direction of flow of said electric current, each said component producing a magnetic field having lines of force generally parallel to said interface and said magnet systems producing respective magnetic fields which are oppositely directed adjacent said interface.

9. The improvement set forth in claim 8 characterized in that each said magnet system component includes an electromagnet, said electromagnet comprising a coil wound upon a U-shaped magnetic core.

10. The improvement set forth in claim 8 characterized in that each said magnet system component comprises an air-cored winding.

11. The improvement set forth in claim 8 characterized in that said container has the form of a rectangular parallelepiped and said magnet systems being disposed in such relation to said container that the lines of force of the respective magnetic fields produced by said systems extend parallel to the shorter sides thereof.

12. The improvement set forth in claim 8 characterized by means for adjustably supporting said magnet systems in relation to said container whereby the position of each said manet system may be displaced in the direction of flow of said electric current.

* * * * *